US012579567B2

(12) United States Patent
Rothschild-Keita

(10) Patent No.: US 12,579,567 B2
(45) Date of Patent: Mar. 17, 2026

(54) METHOD, COMPUTER PROGRAM PRODUCT, AND SYSTEM FOR AUTOMATIC CREATION OF LISTS OF ITEMS ORGANIZED AROUND CO-OCCURRENCES

(71) Applicant: Maplebear Inc., San Francisco, CA (US)

(72) Inventor: Amalia Rothschild-Keita, Berkeley, CA (US)

(73) Assignee: Maplebear Inc., San Francisco, CA (US)

( * ) Notice: Subject to any disclaimer, the term of this patent is extended or adjusted under 35 U.S.C. 154(b) by 189 days.

(21) Appl. No.: 18/209,178

(22) Filed: Jun. 13, 2023

(65) Prior Publication Data

US 2024/0420209 A1      Dec. 19, 2024

(51) Int. Cl.
*G06Q 30/0601*      (2023.01)

(52) U.S. Cl.
CPC ..... *G06Q 30/0631* (2013.01); *G06Q 30/0633* (2013.01); *G06Q 30/0641* (2013.01)

(58) Field of Classification Search
CPC ................ G06Q 30/0601–0645; G06Q 30/08
USPC ................................................ 705/26.1–27.2
See application file for complete search history.

(56) References Cited

U.S. PATENT DOCUMENTS

| 2014/0074649 A1* | 3/2014 | Patel ................... | G06Q 30/0631 |
| | | | 705/26.7 |
| 2021/0090154 A1* | 3/2021 | Michaelson ....... | G06Q 30/0643 |
| 2022/0101250 A1* | 3/2022 | Wang ................. | G06Q 10/0838 |
| 2022/0188366 A1* | 6/2022 | Song ................... | G06F 16/9537 |
| 2024/0289823 A1* | 8/2024 | Wu ..................... | G06Q 30/0631 |

OTHER PUBLICATIONS

Wu, J., A Recommendation Engine for The Recipes by Using Collaborative Filtering in Python, (2021), Web Mining, IS688.*
Creating a Grocery Product and Recipe Recommender, Analytics Vidhya (2021) (Year: 2021).*

* cited by examiner

*Primary Examiner* — Ashley D Preston
(74) *Attorney, Agent, or Firm* — Fenwick & West LLP

(57)      ABSTRACT

Automatic creation of lists of items at an online system organized around co-occurrences of items. The online system provides inputs into a computer model, the inputs including information about items purchased by a user of the online system over a defined time period, information about a catalog of items stored at one or more computer-readable media of the online system, and a plurality of recipes each including a set of co-occurring items. The online system applies the computer model to generate an indication of co-occurrence of each pair of items in each recipe. The online system generates one or more lists of items based on the indication of co-occurrence, each of the one or more lists of items associated with a respective recipe. The online system causes a device of the user to display a user interface with the one or more lists of items for presentation to the user.

18 Claims, 6 Drawing Sheets

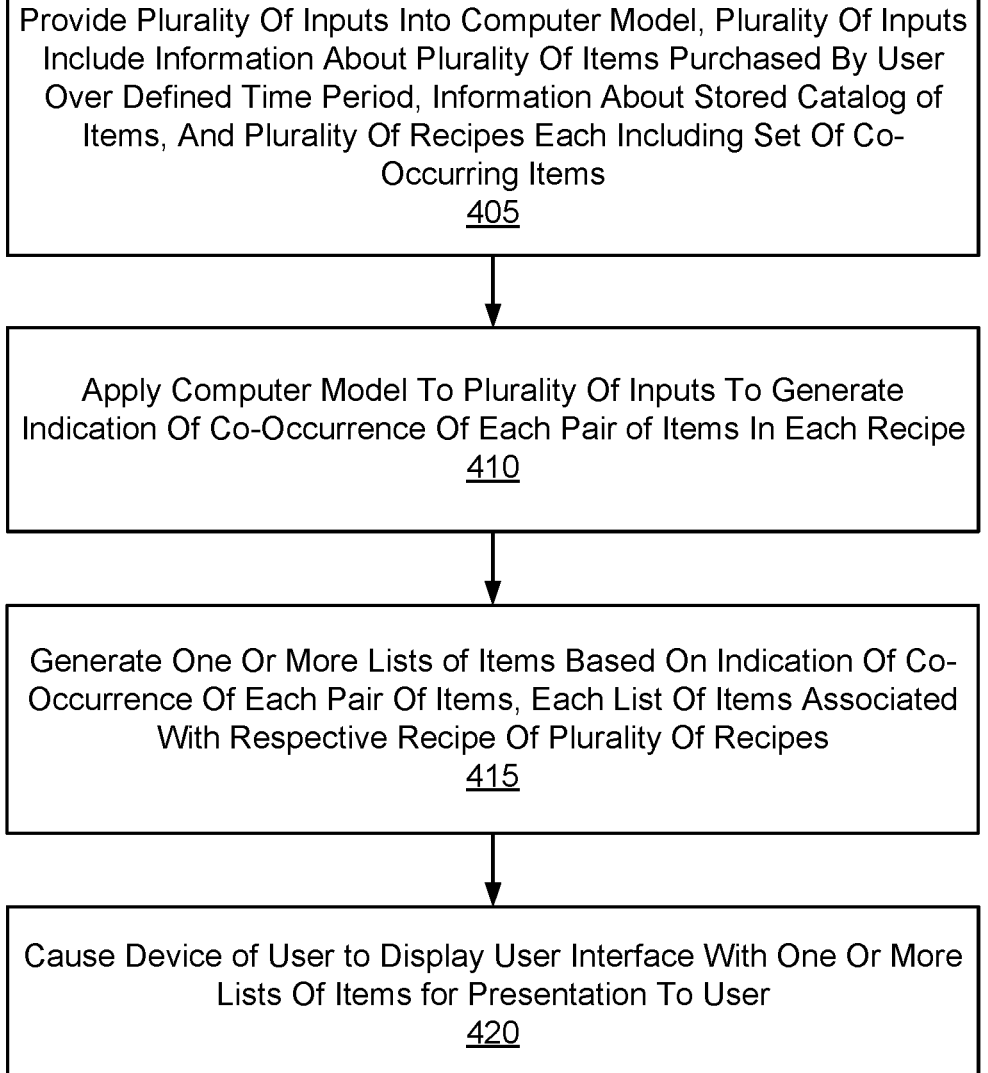

Provide Plurality Of Inputs Into Computer Model, Plurality Of Inputs Include Information About Plurality Of Items Purchased By User Over Defined Time Period, Information About Stored Catalog of Items, And Plurality Of Recipes Each Including Set Of Co-Occurring Items
405

Apply Computer Model To Plurality Of Inputs To Generate Indication Of Co-Occurrence Of Each Pair of Items In Each Recipe
410

Generate One Or More Lists of Items Based On Indication Of Co-Occurrence Of Each Pair Of Items, Each List Of Items Associated With Respective Recipe Of Plurality Of Recipes
415

Cause Device of User to Display User Interface With One Or More Lists Of Items for Presentation To User
420

FIG. 4

METHOD, COMPUTER PROGRAM PRODUCT, AND SYSTEM FOR AUTOMATIC CREATION OF LISTS OF ITEMS ORGANIZED AROUND CO-OCCURRENCES

BACKGROUND

When a person is in a store, the person can walk around the store and browse to discover new items for purchase. For customers that are utilizing online systems, such as online concierge systems, for time savings and efficiency savings when purchasing items, one particular challenge is to create time and/or opportunity for the customers to discover new items. Efficiency-oriented customers are typically shopping based on meals or menus. However, the typical online shopping experience nowadays just emulates going to a store and shopping around aisles, without providing an opportunity for customers to think about meals or menus (i.e., recipes) when purchasing items.

Online systems, such as online concierge systems, enable customers to build lists of items manually for inclusion of items from the lists into future shopping orders. Currently, a list feature of an online concierge system requires a customer of the online concierge system to manually create their own "menu-based" lists. However, manually creating lists of items is an inefficient process that leads to a low consumer engagement. Furthermore, the current version of the Buy-It-Again (BIA) feature of the online concierge system generates random lists of items, i.e., items provided to customers via the BIA feature are often not mutually related. Also, items provided to customers via the BIA feature are not organized around meals and/or menus (i.e., recipes). Additionally, the BIA feature does not consider what item(s) a customer may already have (e.g., spinach or ground beef that the customer would like to use). Hence, it is desirable to organize the online shopping experience around what a customer is going to make, rather than what the customer bought before. This requires configuring an online concierge system for automatic creation of lists of items where each list of items provided to one or more customers of the online concierge system is organized around a specific meal or menu (i.e., recipe).

SUMMARY

In accordance with one or more aspects of the disclosure, an online system provides a plurality of inputs into a computer model of the online system, the plurality of inputs including information about a plurality of items purchased by a user of the online system over a defined time period, information about a catalog of items stored at one or more computer-readable media of the online system, and a plurality of recipes each including a set of co-occurring items. The online system applies the computer model to the plurality of inputs to generate an indication of co-occurrence of each pair of items of the plurality of items in each recipe of the plurality of recipes. The online system generates one or more lists of items based on the indication of co-occurrence of each pair of items, each of the one or more lists of items associated with a respective recipe of the plurality of recipes. The online system causes a device of the user to display a user interface with the one or more lists of items for presentation to the user. The user can include the one or more lists of items into a shopping cart and/or into a shopping list for in-store shopping.

BRIEF DESCRIPTION OF THE DRAWINGS

FIG. 4 is a flowchart of a method of automatic creation of lists of items at an online concierge system where each list is organized around a co-occurrence of items, in accordance with one or more embodiments.

DETAILED DESCRIPTION

Figure 1A:
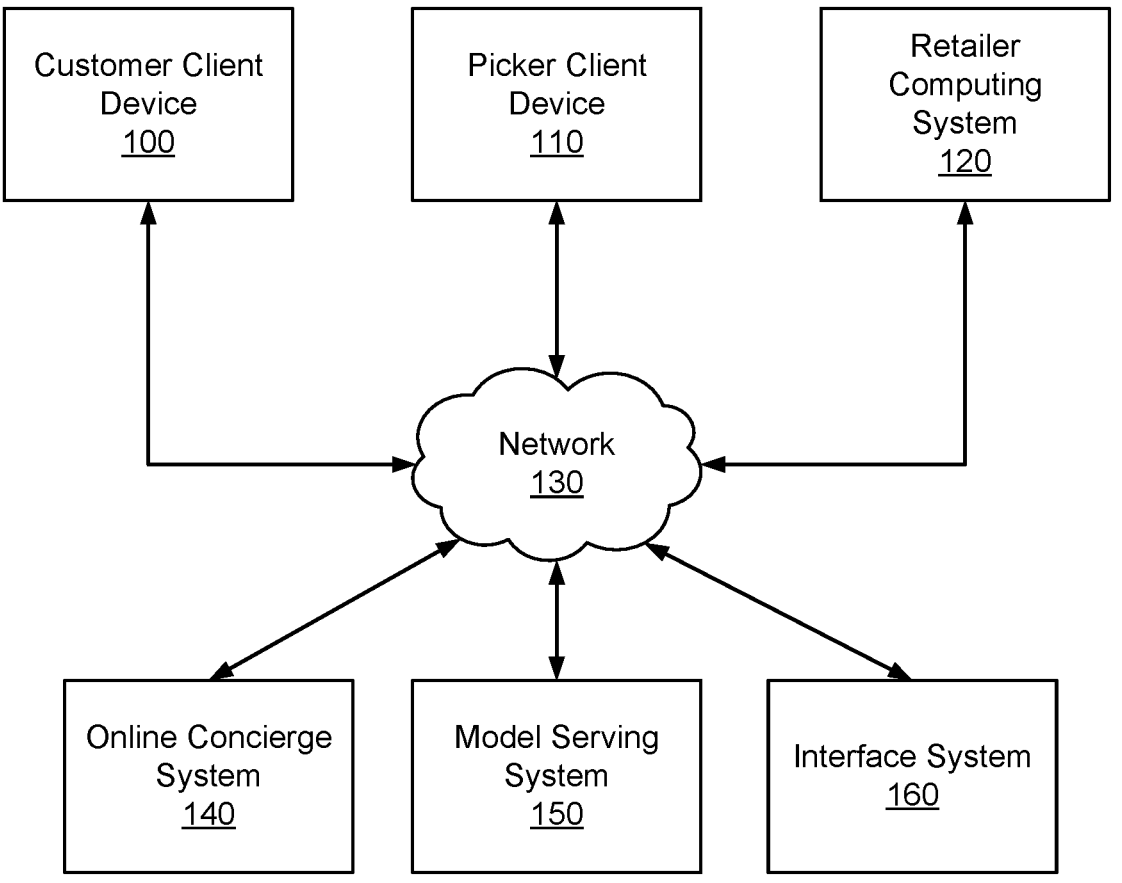
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1A, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In accordance with embodiments of the present disclosure, the online concierge system 140 offers predefined lists of items that customers of the online concierge system 140 can easily add to their shopping carts with a simple selection. To enable the list creation to scale, the online concierge system 140 trains a computer model to automatically add a set of items to create a list of items. The online concierge system 140 may train the computer model based on a co-occurrence of items (e.g., in recipes or previous orders). The online concierge system 140 may utilize the trained computer model to generate embeddings for the items. The online concierge system 140 may then group the items into a list of items using, e.g., the nearest neighbors algorithm.

The online concierge system 140 prepares a first prompt for input to the model serving system 150, where the first prompt includes information about customer's Buy-It-Again (BIA) history and/or information about a current shopping cart, and a task request for grouping items into possible recipes. The online concierge system 140 receives a first response to the first prompt from the model serving system 150 based on execution of the machine-learned model using the first prompt and the task request. The first response includes a plurality of recipes (or meals) that the customer may be preparing. The online concierge system 140 imports the first response (i.e., the plurality of recipes) from the model serving system 150, and uses the computer model to generate lists of items for presentation to the customer based on the imported recipes. The online concierge system 140 may retrain (or retune) the computer model based on any manual adjustments to the generated lists of items made by the customer and/or some other customer's behavior. For example, when the customer manually adds a new item into a generated list of items, the computer model is retrained based on information about the added new item. The next time, the retrained computer model would automatically generate a list of items with this new item included in the list. In general, the online concierge system 140 may retrain the computer model based on feedback information obtained from the customer.

The online concierge system 140 prepares a second prompt for input to the model serving system 150, where the second prompt includes information about items that were grouped in a list of items and/or a name of a recipe associated with the list of items. The online concierge system 140 receives a second response to the second prompt from the model serving system 150 based on execution of the machine-learned model using the second prompt. The second response includes a (default) name and/or a short description of the list of items. The online concierge system 140 imports the second response (i.e., the name and/or short description of the list) from the model serving system 150 for presentation to the customer.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
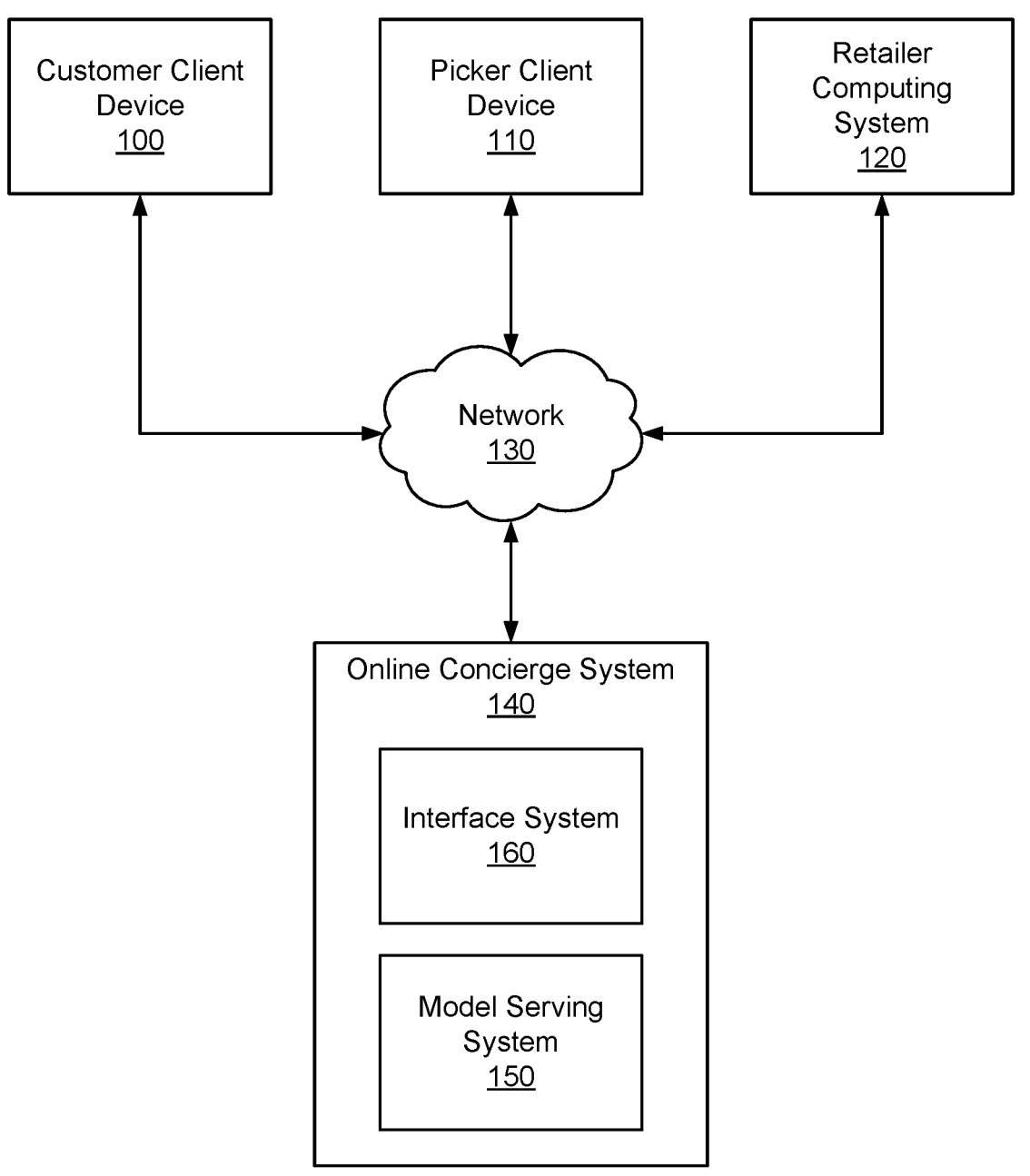
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140.

Figure 2:
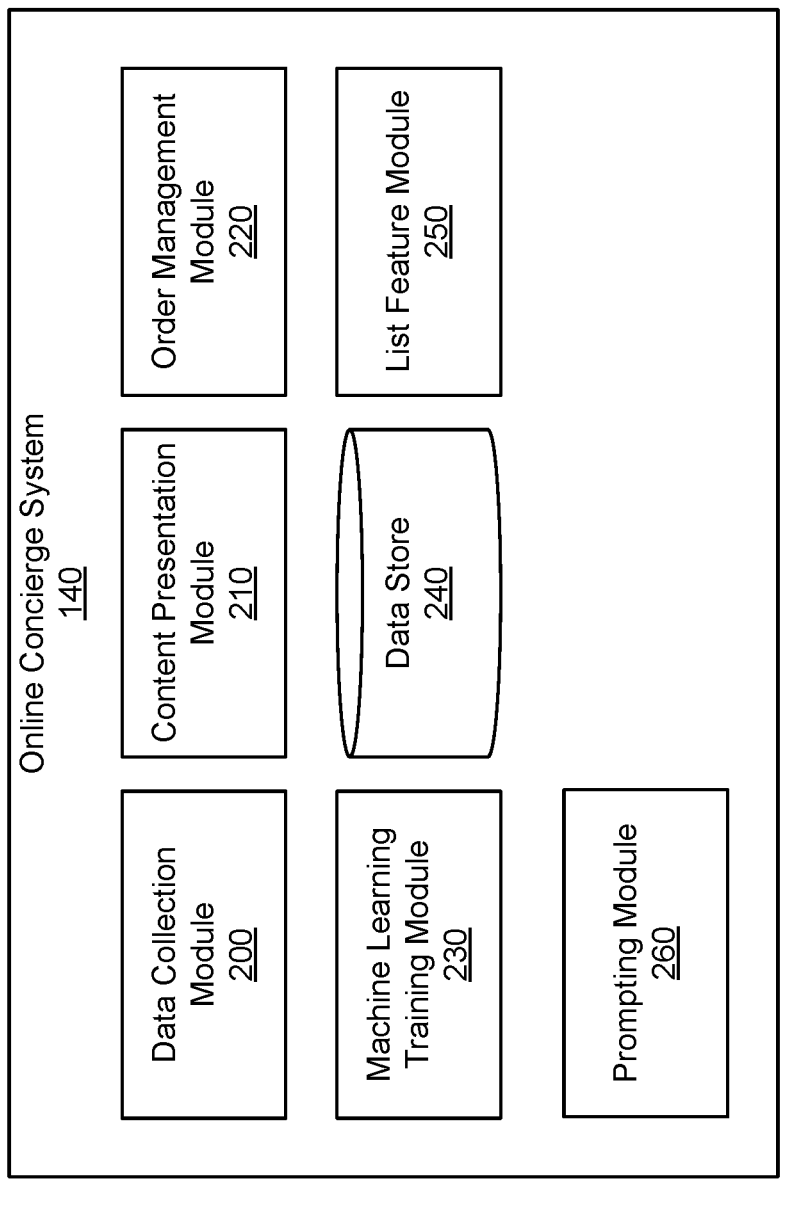
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a list feature module 250, and a prompting module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine learning training module 230 may train the item selection model, the availability model, or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In another embodiment, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The list feature module 250 deploys a computer model to automatically create lists of items for presentation to a customer of the online concierge system 140, where each list of items is organized around a specific co-occurrence of items (i.e., recipe). The computer model deployed by the list feature module 250 may run a machine-learning algorithm to create a list of items that are likely to be purchased together. The computer model is trained (e.g., via the machine-learning training module 230) to intelligently organize lists of items to make them shoppable based on re-occurring menu preferences (e.g., the same recipes in a customer's weekly meal rotation).

The machine-learning training module 230 trains the computer model to predict one or more recipes of a customer of the online concierge system 140 based on a shopping history of the customer. The shopping history of the customer may show that the customer typically buys one particular item (e.g., lettuce) with a set of items (e.g., seven items) that are available from, e.g., the BIA feature of the online concierge system 140. The question is which of these items from the BIA feature would co-occur in a recipe of "lettuce salad"? The machine-learning training module 230 trains the computer model to essentially take the customer through a flow where the computer model captures one or more recipes for the customer, where each recipe includes a set of co-occurring items that are likely to be bought together. Considering, for example, the lettuce to be an anchor item for the recipe of "lettuce salad", the computer model deployed by the list feature module 250 may determine that the customer buys the lettuce with a subset of items (e.g., three other items) that together form the recipe of "lettuce salad". The list feature module 250 then populates the subset of items available from the BIA feature of the online concierge system 140 into a list of items that are likely to be bought by the customer together with the lettuce as part of the recipe of "lettuce salad". The list feature module 250 inputs information about customer's BIA items (or any previously purchased items), or items currently in a shopping cart, and deploys the computer model to group items into one or more lists of items.

The content presentation module 210 causes a device of the customer (e.g., the customer client device 100) to display a user interface with one or more list of items for presentation to the customer. The entire list of items can be included into a shopping cart (and/or a shopping list for in-store shopping) by a single click of the customer. In this manner, by applying the computer model to determine a recipe that the customer is already making, the online concierge system 140 can upsell related items to the customer, i.e., achieving upsells based on recipe re-usage. The list feature module 250 may rank each list of items based on a likelihood of conversion of that list of items by the customer (e.g., determined by the computer model deployed by the list feature module 250). The content presentation module 210 may present the list of items to the customer based on the ranking of each list of items. For example, a highest ranked list of items would be presented on the top and a lowest ranked list of items would be presented on the bottom. For one or more items in the list that the customer buys outside of the online concierge system 140, the content presentation module 210 provides an opportunity for the customer to cancel these one or more items off the list of items before inclusion of remaining items from the list into the shopping cart. Similarly, the content presentation module 210 provides an opportunity for the customer to cancel one or more items off the list that have been already included in the shopping cart. In this manner, the customer can cancel at least one item from each list of items upon presentation of that list of items to the customer. Note that the content presentation module 210 presents different lists of items to different customers of the online concierge system 140. By presenting different lists of items to different customers, the content presentation module 210 effectively performs targeted advertising in order to encourage a specific customer of the online concierge system 140 to purchase a specific list of items.

The list feature module 250 provides a plurality of inputs into the computer model. The plurality of inputs of the computer model includes information about a plurality of items purchased by a customer of the online concierge system 140 over a defined time period, information about a catalog of items stored at one or more computer-readable media of the data store 240, and recipe data with a list of recommended recipes each including a set of co-occurring items (e.g., information what items are grouped together in a recipe). The list feature module 250 may set a weight to each recipe of the plurality of recipes based on information about a purchasing history of items included in each recipe (e.g., weighted by popularity of recipes with a cohort of customers). The list feature module 250 may then provide the weight of each recipe to the computer model as a part of the plurality of inputs.

The list feature module 250 may group customers of the online concierge system 140 into a set of different cohorts based on a defined set of features (e.g., demographic/age, geographic region/location, household composition, etc.). Information about a specific type of the customer (i.e., information about a cohort to which the customer belongs to) may be input into the computer model to determine a co-occurrence of items bought by the specific customer type. The list of recommended recipes that is input into the computer model may be periodically modified, e.g., by seasonally rotating recommended recipes. For example, a different list of recommended recipes would be input into the computer model for different seasons or different holidays.

The computer model deployed by the list feature module 250 is a machine-learning model that takes one or more features (e.g., product information) around a first item and one or more features around a second item and predicts whether the first and second items co-occurred (e.g., purchased together or in the same recipe). The computer model may be trained (e.g., via the machine-learning training module 230) based on information about co-occurrence of items from a predetermined training set of items. The computer model may be trained based on information about a plurality of items purchased by a customer user over a defined time period, one or more recipes of items purchased by one or more other customers of the online concierge system 140, a set of items purchased within a same shopping cart, and/or manual input from one or more customers with grouping of items. The computer model may be trained to determine embeddings in items based on co-occurrences in training data. The computer model may be further trained based on information about a cohort to which a specific customer belongs to. Hence, the computer model may be trained to apply a machine-learning algorithm (e.g., k-nearest neighbors (KNN) algorithm) that is different for each cohort of customers. Essentially, the list feature module 250 may deploy a different computer model for a different cohort of customers. For example, the list feature module 250 may deploy different computer models (i.e., different machine-learning algorithms) for, e.g., new moms and retired people.

The computer model deployed by the list feature module 250 may be updated or retrained (e.g., via the machine-learning training module 230) based on feedback information from customers of the online concierge system 140. Each customer can be allowed to correct/update recipes after a base recipe is created. Based on the correction/updates of recipes provided by the customers, the machine-learning training module 230 can retrain/update a set of parameters of the computer model. For example, when the customer manually adds a new item into a previously generated list of items, the machine-learning training module 230 retrains the computer model based on information about the added new item. When the next time the retrained computer model generates a list of items for the same recipe, this new item will be automatically included in the generated list of items.

Alternatively, instead of utilizing the computer model that is deployed by the list feature module 250, the online concierge system 140 may request the LLM of the model serving system 150 to group items into one or more lists of re-occurring items (i.e., recipes). The prompting module 260 may construct at least one prompt and at least one task request for the LLM. The prompting module 260 may construct a prompt for input to the LLM that includes information about at least one of a repeated shopping history for the customer and one or more items from a current shopping cart of the customer. The prompting module 260 may construct a task request for the LLM to group items into recipes that the customer may be making. An example prompt and the task request for the LLM may be: "Here is the customer's BIA history and the current shopping cart; Can you please group items into possible recipes?" The prompt and the task request constructed by the prompting module 260 is fed into the LLM of the model serving system 150. The LLM generates a response to the prompt and the task request where the response includes groups of items. The model serving system 150 feeds the response with the groups of items to the list feature module 250 and/or the machine-learning training module 230. The list feature module 250 and/or the machine-learning training module 230 may then retrain/retune the computer model based on any manual adjustments to the lists made by the customer.

The prompting module 260 may construct a prompt for input to the model serving system 150 that includes information about items that were grouped in a list of items (e.g., by the computer model). The prompting module 260 may construct a task request for the LLM to generate a name (e.g., default name) and/or a short description for the list of items. An example prompt and the task request for the LLM of the model serving system 150 may be: "Here are the names of items; Please provide a name for a list of the items?" The prompt and the task request constructed by the prompting module 260 is fed into the LLM of the model serving system 150. The LLM generates a response to the prompt and the task request where the response includes a name and/or a short description for the list of items. The model serving system 150 feeds the response with the name and/or short description for the list of items to the content presentation module 210. The content presentation module 210 may then presents the list of items with the LLM-generated name and/or short description to the customer for inclusion into a shopping cart. In one or more embodiments, the order management module 220 (or some other module of the online concierge system 140) automatically adds the list of items into a shopping cart of the customer, e.g., based on a frequency of purchasing items for a corresponding recipe, tastes of the customer, etc. By automatically populating the shopping cart with the list of items, a speed of shopping at the online concierge system 140 can be increased.

The list feature module 250 applies the computer model to the plurality of inputs provided to the computer model to generate an indication of co-occurrence of each pair of items of the plurality of items in each recipe of the plurality of recipes. The list feature module 250 generates one or more lists of items based on the indication of co-occurrence of each pair of items, each of the one or more lists of items associated with a respective recipe of the plurality of recipes. Hence, the computer model deployed by the list feature module 250 predicts whether two items co-occur, i.e., the computer model identifies a set of items that are likely part of a same recipe.

The computer model deployed by the list feature module 250 may output embeddings for the plurality of items in a latent space providing the indication of co-occurrence of each pair of items. The computer model may be, e.g., a two-tower model. A first tower of the computer model may generate a first indication (e.g., binary 0 or 1) of co-occurrence of a first item of the plurality of items with a second item of the plurality of items. A second tower of the computer model may generate a second indication (e.g., binary 0 or 1) of co-occurrence of the second item with the first item. The computer model may then combine (e.g., by applying dot product) last layers of the first and second towers to generate embeddings for the plurality of items in the latent space. The computer model may thus combine the first indication for co-occurrence of the first item with the second item with the second indication for co-occurrence of the second item with the first item to generate embeddings for the first item and the second item in the latent space—which is a final indication of whether the first item will be purchased with the second item or not.

Figure 3A:
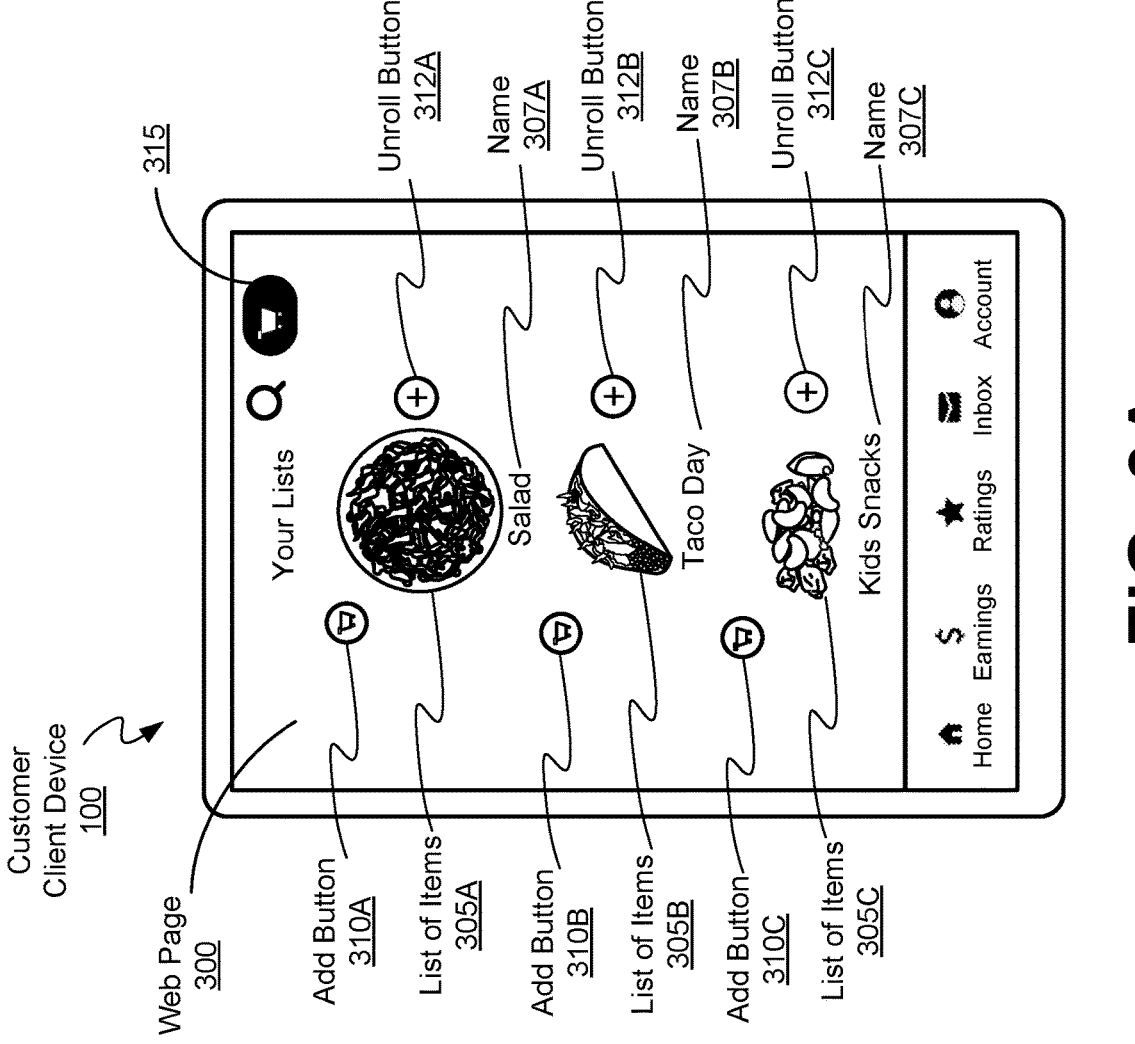
FIG. 3A illustrates an example webpage of a customer client device with lists of items organized around co-occurrences of items, in accordance with one or more embodiments.

FIG. 3A illustrates an example webpage 300 of the customer client device 100 with lists of items organized around co-occurrences of items, in accordance with one or more embodiments. Instead of manual list creation that sifts through a lengthy and unorganized BIA list of items, the content presentation module 210 presents to a customer via the customer client device 100 automatically generated recipe-based lists of items. The example webpage 300 shows three different lists—a list of items 305A (e.g., "Salad" list of items), a list of items 305B (e.g., "Taco Day" list of items), and a list of items 305C (e.g., "Kids Snacks" list of items). It should be understood that the customer client device 100 can present more or less lists of items than what is illustrated in FIG. 3A. The lists of items 305A, 305B, 305C are specifically generated for the customer by deploying the computer model (e.g., via the list feature module 250). The lists of items 305A, 305B, 305C may be ranked (e.g., via the list feature module 250) based on a likelihood of conversion, e.g., the list of items 305A may have a highest likelihood of conversion by the customer and the list of items 305C may have a lowest likelihood of conversion by the customer.

Each name 307A (e.g., "Salad"), 307B (e.g., "Taco Day") and 307C (e.g., "Kids Snacks") of a list of items 305A, 305B, 305C may be a default name generated by the LLM of the model serving system 150 and provided to the content presentation module 210 for presentation to the customer via the customer client device 100. Alternatively, instead of a default name 307A, 307B, 307C, the customer client device 100 presents a short description for a list of items 305A, 305B, 305C that is generated by the LLM of the model serving system 150. With a single click at a corresponding add button 310A, 310B, 310C, the customer can include all items grouped within a selected list of items 305A, 305B, 305C into a shopping cart 315. Once the customer clicks at an unroll button 312A, 312B, 312C, a corresponding list of items 305A, 305B, 305C would unroll and show specific items that were grouped within the corresponding list 305A, 305B, 305C, as shown in FIG. 3B.

Figure 3B:
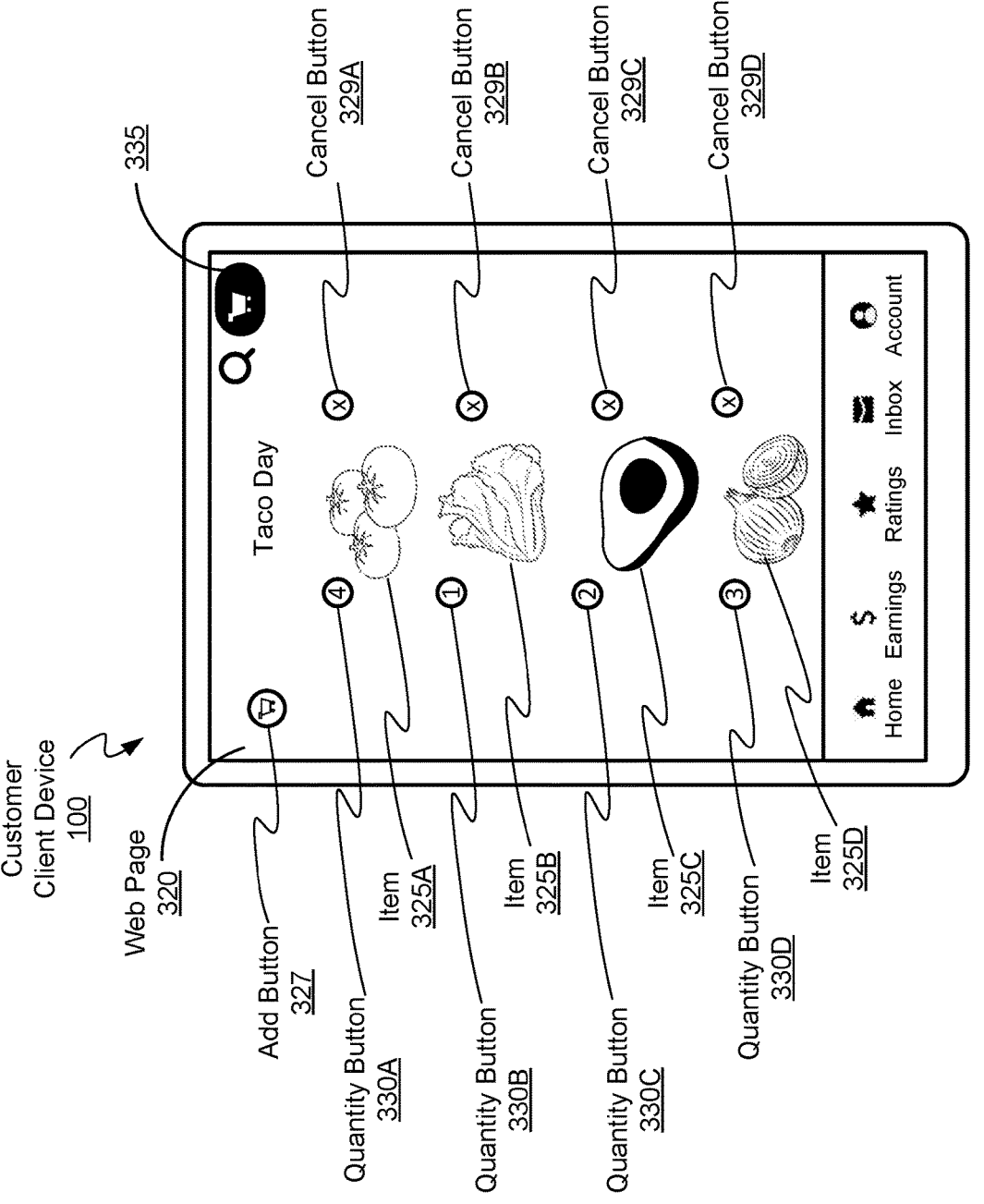
FIG. 3B illustrates an example webpage of a customer client device with an unrolled list of items organized around a co-occurrence, in accordance with one or more embodiments.

FIG. 3B illustrates an example webpage 320 of the customer client device 100 with an unrolled list of items organized around a co-occurrence (i.e., recipe), in accordance with one or more embodiments. In FIG. 3B, the customer client device 100 presents an unrolled list of items 305B (i.e., "Taco Day" list of items) with individual items 325A, 325B, 325C and 325D that are part of "Taco Day" recipe. It should be understood that the unrolled list of items 305B can include more or less items than what is illustrated in FIG. 3B. With a single click at an add button 327, the customer can include all the items 325A, 325B, 325C and 325D grouped within the list of items 305B into a shopping cart 335. In this manner, the online concierge system 140 can upsell co-occurrence related items to the customer, i.e., items that are part of a same recipe that has a high likelihood that the customer is making it. Furthermore, by utilizing a corresponding quantity button 330A, 330B, 330C, 330D, the customer can select a quantity for each item 325A, 325B, 325C and 325D. With a click at a corresponding cancel button 329A, 329B, 329C, 329D, the customer can cancel any item from the list of items 305B before including all other remaining items into the shopping cart 335 via the add button 327.

FIG. 4 is a flowchart of a method of automatic creation of lists of items at an online concierge system where each list is organized around a co-occurrence of items, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 provides 405 a plurality of inputs into a computer model, the plurality of inputs including information about a plurality of items purchased by a user (e.g., customer) of the online concierge system 140 over a defined time period, information about a catalog of items stored at one or more computer-readable media (e.g., of the data store 240), and a plurality of recipes each including a set of co-occurring items. The online concierge system 140 may set (e.g., via the list feature module 250) a weight to each recipe of the plurality of recipes based on information about a purchasing history of items included in each recipe. The online concierge system 140 may provide (e.g., via the list feature module 250) the weight of each recipe to the computer model as a part of the plurality of inputs. The online concierge system 140 may feed information about at least one of a repeated shopping history for the user and one or more items from a current shopping cart of the user into a LLM (e.g., of the model serving system 150) to generate information about the plurality of recipes associated with the user.

The online concierge system 140 may train (e.g., via the machine-learning training module 230) the computer model based on information about co-occurrence of items from a predetermined set of items. The online concierge system 140 may train (e.g., via the machine-learning training module 230) the computer model based on the information about the plurality of items purchased by the user over the defined time period, one or more recipes of items purchased by one or more users of the online system, and a set of items purchased within a same shopping cart. The online concierge system 140 may group (e.g., via the list feature module 250) a plurality of users of the online system into a set of cohorts based on a defined set of features. The online concierge system 140 may train the computer model (e.g., via the machine-learning training module 230) at least based on information about a cohort of the set of cohorts to which the user belongs to. The online concierge system 140 may retrain the computer model (e.g., via the machine-learning training module 230) based on feedback information from the user in relation to the presentation of the one or more lists of items.

The online concierge system 140 applies 410 (e.g., via the list feature module 250) the computer model to the plurality of inputs to generate an indication of co-occurrence of each pair of items of the plurality of items in each recipe of the plurality of recipes. The online concierge system 140 may output (e.g., via the computer model) embeddings of the plurality of items in a latent space providing the indication of co-occurrence of each pair of items. The online concierge system 140 may generate (e.g., via the computer model) a first indication of co-occurrence of a first item of the plurality of items with a second item of the plurality of items, and a second indication of co-occurrence of the second item with the first item. The online concierge system 140 may combine (e.g., via the computer model) the first indication and the second indication to generate embeddings for the first item and the second item in the latent space.

The online concierge system 140 generates 415 (e.g., via the list feature module 250) one or more lists of items based on the indication of co-occurrence of each pair of items, each of the one or more lists of items associated with a respective recipe of the plurality of recipes. The online concierge system 140 may feed information about items grouped in a list of the one or more lists into a LLM (e.g., of the model serving system 150) to generate a name of the list.

The online concierge system 140 causes 420 (e.g., via the content presentation module 210) a device of the user (e.g., the customer client device 100) to display a user interface with the one or more lists of items. The user can include (e.g., via the user interface of the customer client device 100) the one or more lists of items into a shopping cart (and/or into a shopping list for in-store shopping). The online concierge system 140 may rank (e.g., via the list feature module 250) each list of the one or more lists of items based on a likelihood of conversion of that list by the user. The online concierge system 140 may present (e.g., via the content presentation module 210) the one or more lists of items to the user based on the ranking of each list. The online concierge system 140 may allow (e.g., via the content presentation module 210) the user to remove at least one item from each of the one or more lists of items upon presentation of the one or more lists of items to the user. Alternatively, the online concierge system 140 may automatically populate (e.g., via the order management module 220) the list of items into a shopping cart of the user.

Embodiments of the present disclosure are directed to automatically creating shoppable lists of items where each list is organized around a co-occurrence of items, while leveraging the BIA feature of an online system. Upon presentation of a list of items to a customer of the online system, the customer can use one-click to add all items from the list into a shopping cart. The method presented herein employs a computer model of the online system (e.g., machine-learning model) to group items into one or more lists, where the computer model is trained based on a co-occurrence training set. The computer model is trained to intelligently organize lists to make them shoppable based on re-occurring menu preferences (e.g., same recipes in a customer's weekly meal rotation). The method and the online system presented herein make the shopping experience efficient for returning customers by helping customers quickly shop by a recipe (menu), instead of culling together items. In this manner, the online system presented herein is able to better upsell items, such as specific items associated with specific recipes.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

obtaining a plurality of inputs including information about a plurality of items purchased by a user of an online system over a defined time period, information about a catalog of items stored at one or more computer-readable media of the online system, and a plurality of recipes each including a set of co-occurring items;

accessing a two-tower machine-learning model that comprises a first tower of neural network layers and a second tower of neural network layers, wherein the two-tower machine-learning model is trained by, for each of a plurality of training examples that includes one or more features for a first item, one or more features for a second item, and a label indicating a co-occurrence of the first and second items:

generating a first embedding by inputting the one or more features of the first item into the first tower of the two-tower machine-learning model, generating a second embedding by inputting the one or more features of the second item into the second tower of the two-tower machine-learning model, combining the first embedding and the second embedding to generate an output indicating a predicted co-occurrence of the first and second items, comparing the output to the label to compute an error, and updating, based on the computed error and through a backpropagation process, a set of parameters of the two-tower machine-learning model;

applying the two-tower machine-learning model to the plurality of inputs for each of the plurality of items to generate an embedding for each of the plurality of items in a latent space;

storing, in a database of the online system, embeddings for the plurality of items generated by the two-tower machine-learning model;

grouping, using the embeddings, the plurality of items into a plurality of lists of items, each of the plurality of lists of items associated with a respective recipe of the plurality of recipes;

applying the two-tower machine-learning model to information about each of the plurality of lists of items to generate a rank for each of the plurality of lists of items that is indicative of a predicted likelihood of conversion of each of the plurality of lists of items by the user;

ranking, using the rank for each of the plurality of lists of items, each of the plurality of lists of items to generate a plurality of ranked lists of items; and causing, using information about the plurality of ranked lists of items, a device associated with the user to generate a user interface, wherein generating the user interface comprises rendering, in a single view, a scrollable component including the plurality of ranked lists of items linked to a cart object displayed at the user interface, each ranked list of items of the plurality of ranked lists of items placed at a respective position of the user interface according to the rank, the cart object being updated with each ranked list of items in response to a single selection of a corresponding add-all control element linked to each ranked list of items.

2. The method of claim 1, wherein applying the two-tower machine-learning model further comprises:

applying the two-tower machine-learning model to generate a first indication of co-occurrence of a first item of the plurality of items with a second item of the plurality of items;

applying the two-tower machine-learning model to generate a second indication of co-occurrence of the second item of the plurality of items with the first item of the plurality of items; and combining the first indication and the second indication to generate embeddings for the first item of the plurality of items and the second item of the plurality of items in the latent space.

3. The method of claim 1, further comprising:

generating a prompt for input into a language model, the prompt including information about at least one of a repeated shopping history for the user and one or more items from the cart object; and requesting the language model to generate, using the prompt, information about the plurality of recipes associated with the user.

4. The method of claim 1, further comprising:

generating a prompt for input into a language model, the prompt including information about items grouped in a list of the plurality of lists; and requesting the language model to generate, using the prompt, a name of the list.

5. The method of claim 1, further comprising:

generating the set of parameters of the two-tower machine-learning model using training data including information about co-occurrence of items from a predetermined set of items.

6. The method of claim 1, further comprising:

generating the set of parameters of the two-tower machine-learning model using training data including the information about the plurality of items purchased by the user over the defined time period, one or more recipes of items purchased by one or more users of the online system, and a set of items purchased within a same cart object.

7. The method of claim 1, further comprising:

setting a weight of each recipe of the plurality of recipes using information about a purchasing history of items included in each recipe, wherein applying the two-tower machine-learning model comprises applying the two-tower machine-learning model further to the weight of each recipe to generate the embedding.

8. The method of claim 1, further comprising:

removing, via the user interface, at least one item from each ranked list of items of the plurality of ranked lists of items.

9. The method of claim 1, further comprising:

grouping a plurality of users of the online system into a set of cohorts based on a defined set of features; and generating the set of parameters of the two-tower machine-learning model using training data including information about a cohort of the set of cohorts to which the user belongs to.

10. The method of claim 1, further comprising:

updating the set of parameters of the two-tower machine-learning model using feedback information in relation to a conversion by the user of each ranked list of items of the plurality of ranked lists of items.

11. The method of claim 1, further comprising:

identifying, using the rank for each of the plurality of lists of items, a preferred list of items from the plurality of lists of items; and automatically populating the cart object with the preferred list of items.

12. A computer program product comprising a non-transitory computer readable storage medium having instructions encoded thereon that, when executed by a processor, cause the processor to perform steps comprising:

obtaining a plurality of inputs including information about a plurality of items purchased by a user of an online system over a defined time period, information about a catalog of items stored at one or more computer-readable media of the online system, and a plurality of recipes each including a set of co-occurring items;

accessing a two-tower machine-learning model that comprises a first tower of neural network layers and a second tower of neural network layers, wherein the two-tower machine-learning model is trained by, for each of a plurality of training examples that includes one or more features for a first item, one or more features for a second item, and a label indicating a co-occurrence of the first and second items:

generating a first embedding by inputting the one or more features of the first item into the first tower of the two-tower machine-learning model, generating a second embedding by inputting the one or more features of the second item into the second tower of the two-tower machine-learning model, combining the first embedding and the second embedding to generate an output indicating a predicted co-occurrence of the first and second items, comparing the output to the label to compute an error, and updating, based on the computed error and through a backpropagation process, a set of parameters of the two-tower machine-learning model;

applying the two-tower machine-learning model to the plurality of inputs for each of the plurality of items to generate an embedding for each of the plurality of items in a latent space;

storing, in a database of the online system, embeddings for the plurality of items generated by the two-tower machine-learning model;

grouping, using the embeddings, the plurality of items into a plurality of lists of items, each of the plurality of lists of items associated with a respective recipe of the plurality of recipes;

applying the two-tower machine-learning model to information about each of the plurality of lists of items to generate a rank for each of the plurality of lists of items that is indicative of a predicted likelihood of conversion of each of the plurality of lists of items by the user;

ranking, using the rank for each of the plurality of lists of items, each of the plurality of lists of items to generate a plurality of ranked lists of items; and causing, using information about the plurality of ranked lists of items, a device associated with the user to generate a user interface, wherein generating the user interface comprises rendering, in a single view, a scrollable component including the plurality of ranked lists of items linked to a cart object displayed at the user interface, each ranked list of items of the plurality of ranked lists of items placed at a respective position of the user interface according to the rank, the cart object being updated with each ranked list of items in response to a single selection of a corresponding add-all control element linked to each ranked list of items.

13. The computer program product of claim 12, wherein the instructions further cause the processor to perform steps comprising:

applying the two-tower machine-learning model to generate a first indication of co-occurrence of a first item of the plurality of items with a second item of the plurality of items;

applying the two-tower machine-learning model to generate a second indication of co-occurrence of the second item of the plurality of items with the first item of the plurality of items; and combining the first indication and the second indication to generate embeddings for the first item of the plurality of items and the second item of the plurality of items in the latent space.

14. The computer program product of claim 12, wherein the instructions further cause the processor to perform steps comprising:

generating a first prompt for input into a language model, the first prompt including information about at least one of a repeated shopping history for the user and one or more items from the cart object;

requesting the language model to generate, using the first prompt, information about the plurality of recipes associated with the user;

generating a second prompt for input into the language model, the second prompt including information about items grouped in a list of the plurality of lists; and requesting the language model to generate, using the second prompt, a name of the list.

15. The computer program product of claim 12, wherein the instructions further cause the processor to perform steps comprising:

generating the set of parameters of the two-tower machine-learning model using training data including the information about the plurality of items purchased by the user over the defined time period, one or more recipes of items purchased by one or more users of the online system, and a set of items purchased within a same cart object.

16. The computer program product of claim 12, wherein the instructions further cause the processor to perform steps comprising:

setting a weight of each recipe of the plurality of recipes using information about a purchasing history of items included in each recipe; and applying the two-tower machine-learning model further to the weight of each recipe to generate the embedding.

17. The computer program product of claim 12, wherein the instructions further cause the processor to perform steps comprising:

removing, via the user interface, at least one item from each ranked list of items of the plurality of ranked lists of items.

18. A computer system comprising:

a processor; and a non-transitory computer-readable storage medium having instructions that, when executed by the processor, cause the computer system to perform steps comprising:

obtaining a plurality of inputs including information about a plurality of items purchased by a user of an online system over a defined time period, information about a catalog of items stored at one or more computer-readable media of the online system, and a plurality of recipes each including a set of co-occurring items;

accessing a two-tower machine-learning model that comprises a first tower of neural network layers and a second tower of neural network layers, wherein the two-tower machine-learning model is trained by, for each of a plurality of training examples that includes one or more features for a first item, one or more features for a second item, and a label indicating a co-occurrence of the first and second items:

generating a first embedding by inputting the one or more features of the first item into the first tower of the two-tower machine-learning model, generating a second embedding by inputting the one or more features of the second item into the second tower of the two-tower machine-learning model, combining the first embedding and the second embedding to generate an output indicating a predicted co-occurrence of the first and second items, comparing the output to the label to compute an error, and updating, based on the computed error and through a backpropagation process, a set of parameters of the two-tower machine-learning model;

applying the two-tower machine-learning model to the plurality of inputs for each of the plurality of items to generate an embedding for each of the plurality of items in a latent space;

storing, in a database of the online system, embeddings for the plurality of items generated by the two-tower machine-learning model;

grouping, using the embeddings, the plurality of items into a plurality of lists of items, each of the plurality of lists of items associated with a respective recipe of the plurality of recipes;

applying the two-tower machine-learning model to information about each of the plurality of lists of items to generate a rank for each of the plurality of lists of items that is indicative of a predicted likelihood of conversion of each of the plurality of lists of items by the user;

ranking, using the rank for each of the plurality of lists of items, each of the plurality of lists of items to generate a plurality of ranked lists of items; and causing, using information about the plurality of ranked lists of items, a device associated with the user to generate a user interface, wherein generating the user interface comprises rendering, in a single view, a scrollable component including the plurality of ranked lists of items linked to a cart object displayed at the user interface, each ranked list of items of the plurality of ranked lists of items placed at a respective position of the user interface according to the rank, the cart object being updated with each ranked list of items in response to a single selection of a corresponding add-all control element linked to each ranked list of items.

\* \* \* \* \*